United States Patent
Seefeld et al.

(10) Patent No.: US 8,777,484 B2
(45) Date of Patent: Jul. 15, 2014

(54) RESISTANCE TEMPERATURE SENSOR

(75) Inventors: Peter Seefeld, Pfronten (DE); Reinhard Buchner, Nesselwang (DE)

(73) Assignee: Endress + Hauser Wetzer GmbH + Co. KG, Nesselwang (DE)

( * ) Notice: Subject to any disclaimer, the term of this patent is extended or adjusted under 35 U.S.C. 154(b) by 245 days.

(21) Appl. No.: 13/166,854

(22) Filed: Jun. 23, 2011

(65) Prior Publication Data

US 2011/0317741 A1 Dec. 29, 2011

Related U.S. Application Data

(60) Provisional application No. 61/344,285, filed on Jun. 23, 2010.

(30) Foreign Application Priority Data

Jun. 23, 2010 (DE) .......................... 10 2010 030 442

(51) Int. Cl.
*G01K 7/16* (2006.01)
*G01J 5/20* (2006.01)
*H01C 3/08* (2006.01)

(52) U.S. Cl.
USPC ............. 374/163; 374/43; 374/185; 374/120; 338/25

(58) Field of Classification Search
USPC ............. 374/120, 160–162, 178, 43–45, 163, 374/185, 100, 6, 187; 338/22 R, 28, 25; 333/219, 234
See application file for complete search history.

(56) References Cited

U.S. PATENT DOCUMENTS

| | | | | | |
|---|---|---|---|---|---|
| 3,232,787 | A | * | 2/1966 | Bennett | 428/433 |
| 4,642,672 | A | * | 2/1987 | Kitakata | 257/797 |
| 5,308,980 | A | * | 5/1994 | Barton | 250/338.4 |
| 5,488,226 | A | * | 1/1996 | Iafrate et al. | 250/338.4 |
| RE36,050 | E | * | 1/1999 | Thakur et al. | 374/161 |
| 6,118,166 | A | * | 9/2000 | Shoji et al. | 257/467 |
| 6,958,535 | B2 | * | 10/2005 | Hirano et al. | 257/707 |
| 8,294,535 | B2 | * | 10/2012 | Feiertag et al. | 333/187 |
| 2001/0031407 | A1 | * | 10/2001 | Okino et al. | 430/30 |
| 2008/0084205 | A1 | * | 4/2008 | Zimmer | 324/252 |
| 2009/0224851 | A1 | * | 9/2009 | Feiertag et al. | 333/186 |
| 2010/0181869 | A1 | * | 7/2010 | Pereira da Cunha et al. | 310/313 R |

FOREIGN PATENT DOCUMENTS

| | | |
|---|---|---|
| DE | 30 22 942 C2 | 12/1981 |
| DE | 192 48 411 B3 | 5/2004 |
| DE | 10 2006 005 393 A1 | 8/2007 |

(Continued)

OTHER PUBLICATIONS

German Search Report.

(Continued)

*Primary Examiner* — Gail Verbitsky
(74) *Attorney, Agent, or Firm* — Bacon & Thomas, PLLC

(57) ABSTRACT

A resistance temperature sensor with a first temperature sensor element and a second temperature sensor element, wherein the first temperature sensor element comprises a first measuring path and the second temperature sensor element a second measuring path, wherein the first and the second measuring paths extend on a substrate, wherein the substrate has an anisotropic thermal expansion with at least two mutually differing expansion directions (a, c), and wherein a projection of the first measuring path on the expansion directions (a) differs from a projection of the second measuring path on the expansion directions (c).

13 Claims, 5 Drawing Sheets

(56) References Cited

FOREIGN PATENT DOCUMENTS

| DE | 20 2004 021 438 U1 | 3/2008 |
| DE | 10 2008 055 774 A1 | 5/2010 |
| EP | 0 828 146 A1 | 3/1998 |
| GB | 2 426 336 | 11/2006 |
| JP | 08178768 A * | 7/1996 |
| JP | 2007285725 A * | 11/2007 |

OTHER PUBLICATIONS

English translation of the IPR, May 11, 2011, Geneva.

International Search Report in corresponding International Application No. PCT/EP2011/057637 dated Sep. 16, 2011.

* cited by examiner

RESISTANCE TEMPERATURE SENSOR

CROSS-REFERENCE TO RELATED APPLICATION

This is a nonprovisional application, claiming the benefit of U.S. Provisional Application No. 61/344,285 filed on Jun. 23, 2010.

TECHNICAL FIELD

The invention relates to a resistance temperature sensor and a measuring device with such a resistance temperature sensor.

BACKGROUND DISCUSSION

Temperature dependent resistors, or resistances, arrangements comprising a number of such resistors and measuring devices using such resistors for registering a process variable, especially temperature, are known in the state of the art.

Thus, for example, Offenlegungsschrift EP 0828146 A1 discloses a self-monitoring temperature measuring apparatus with a first and a second resistance element with positive or negative resistance coefficients. The two resistance elements lie in parallel electrical current paths, of which one includes a diode which allows electrical current to flow in one direction only. The resistances of the two resistance elements are determined by a corresponding circuit which periodically changes a voltage applied to the electrical current paths, especially by reversing polarity.

An arrangement of sensor elements is also known from the Gebrauchsmuster DE 202004021438 U1. In such case, the sensor elements have electrical impedances that differ with regard to their temperature coefficients and, integrated in a sensor head, are thermally coupled with one another and with the medium to be measured.

A resistance temperature sensor, which comprises a first and a second sensor unit, which, for example, are manufactured using thin film technology, wherein the sensor units are arranged in parallel planes one on top of the other in order to enable a compact construction of the resistance temperature sensor, is known from Offenlegungsschrift DE 102006005393 A1

However, these arrangements require complex wiring as well as an increased space requirement due to the separately executed temperature sensors, or at least are not directly suitable for self monitoring and/or self calibrating. Moreover, measuring devices, which are installed, for example, in a plant utilizing process automation technology, should not disturb the actual process. Consequently, further miniaturization is desired. Also simplification is desired, in order to reduce costs, for example, of manufacture of the measuring devices.

SUMMARY OF THE INVENTION

An object of the invention is to provide a compact apparatus for temperature measurement not having the above mentioned disadvantages.

According to the invention, the object is achieved by a resistance temperature sensor as well as a measuring device with such a resistance temperature sensor.

As regards the resistance temperature sensor, the object is achieved by a resistance temperature sensor having a first temperature sensor element and a second temperature sensor element, wherein the first temperature sensor element has a first measuring path and the second temperature sensor element has a second measuring path, wherein the first and the second measuring paths extend on a substrate, wherein the substrate has an anisotropic thermal expansion with at least two mutually differing expansion directions, and wherein a projection of the first measuring path on the expansion directions differs from a projection of the second measuring path on the expansion directions.

Instead of the substrate, any other support element with an anisotropic thermal expansion can also be used. By using two different temperature sensor elements, it can be assured that drift occurring, in given cases, in the resistance temperature sensor can be recognized and/or diagnosed. Moreover, in the case of failure of one of the temperature sensor elements, the determining of the temperature can be continued using the other temperature sensor element. The first or the second temperature sensor element can thus be applied for monitoring the second or the first temperature sensor element.

Via the first or the second measuring path, a value and/or curve of a physical variable, here the temperature, can be ascertained. The present invention accordingly provides differently extending measuring paths for determining temperature. Furthermore, the present invention provides that the measuring paths can extend on a substrate with an anisotropic, i.e. directionally dependent, thermal expansion. For such purpose, the substrate can have at least two directions having different thermal expansions. Thus, the first and the second temperature sensor element can comprise the same substrate for example, but differ, however, as regards the measuring paths which extend along the substrate. In this way, the first and the second measuring paths also differ as regards their projections on the expansion directions. For example, the measuring paths can extend so that the components of the measuring paths differ from one another as regards the directions predetermined by the expansion directions. In this way, the measuring paths thus experience a thermal expansion due to the underlying substrate with an anisotropic thermal expansion, and the resistances present over the respective measuring paths change. It can additionally be exploited that the resistance of the first measuring path and the second measuring path do not change at the same rate due to the substrate with an anisotropic thermal expansion, since for example, the coefficient of thermal expansion of the substrate is directionally dependent and the resistances differ from one another depending on direction. This can essentially be due to the thermal expansion of the substrate. The substrate can thus have, for example, a directionally dependent length coefficient of expansion or a directionally dependent volume coefficient of expansion. The size of this effect, i.e. the thermal expansion, can, in such case, depend on the material used for the substrate. The thermal expansion or the coefficient of thermal expansion can also be temperature dependent.

If one assigns, for example, a first vector to one of the expansion directions, and, for example, a second vector to the first measuring path, then the projection of the second vector on the first vector is given by the vector that extends in the direction of the first vector, as limited by the foot of the perpendicular to the first vector, which perpendicular extends through the end point of the second vector. Of course, a plurality of vectors which describe, for example the route of the first or second measuring path, can also be projected onto the expansion directions. This projection, or also only the length of the projected vector, can be taken into consideration for a comparison for determining whether the first and the second measuring paths differ from one another as regards their projections on the expansion directions.

In an embodiment of the resistance temperature sensor, the first and/or the second temperature sensor element comprise at least one thin film coating which is applied to the substrate. In such case, the thin film coating can be applied to the substrate by a conventional method known from the state of the art, for example by means of a physical and/or chemical gas deposition process. The thicknesses of the thin film layer can, in such case, lie in the micrometer range (μm), especially it can also be less than 1 μm ($10^{-6}$ m). Thin film coatings should not be only understood as coatings which are produced by additive processes such as sputtering, for example, but also coatings which arise by subtractive processes such as etching, for example.

In an embodiment of the resistance temperature sensor, the thin film coating forms a thin film resistance. Thus, especially a single, especially a continuous thin, film coating, on which two measuring paths are defined, can be utilized. In this way, a compact resistance temperature sensor can be produced which can additionally calibrate and/or monitor itself. In such case, the effect that in the case of an expansion of the substrate, the thin film coating applied to the substrate likewise expands or shrinks and thereby changes the electrical resistance of the first and the second measuring path, is exploited.

In another embodiment of the resistance temperature sensor, the first measuring path is a first thin film resistance and the second measuring path is a second thin film resistance, wherein the first and the second thin film resistances are applied on different surface regions of the substrate. Accordingly, the first measuring path can also be applied to a thin film layer, especially in different surface regions of the substrate than the second measuring path. For example, the thin film resistances and the associated measuring paths and the associated temperature sensor elements can be applied on opposite sides of the substrate.

In an embodiment of the resistance temperature sensor, the first or the second measuring path extends on the substrate, such that the first measuring path experiences a different thermal expansion than the second measuring path due to the anisotropic thermal expansion of the substrate. For example, the substrate can experience a thermally related contraction in one direction and a thermally related expansion in another direction. This can also affect then the first and the second measuring path or the thin film coating applied to the substrate in the manner mentioned above.

In an embodiment of the resistance temperature sensor, the first measuring path extends on the substrate at least sectionally along an expansion direction which has a different thermal expansion compared to an expansion direction along which the second measuring path extends.

In an embodiment of the resistance temperature sensor, at least a first and a second pair of electrical contacts are provided, by means of which the first and/or the second measuring path are contactable. One of the temperature sensor elements can thus essentially comprise the substrate, the thin film coating applied thereon, the measuring path defined by the thin film coating as well as the contacts for contacting the thin film layer. The resistance temperature sensor provided can then comprise at least two, preferably exactly two, such temperature sensor elements. The first or second measuring path extends, in such case, between the first or the second pair of electrical contacts.

In an embodiment of the resistance temperature sensor, the first and, respectively, the second measuring paths are predetermined by the first and, respectively, the second pair of electrical contacts. The measuring paths can be defined by the positioning of the contacts on the thin film coating. Thus the first pair of electrical contacts by which the first measuring path is defined, for example, can be arranged on opposite ends of the thin film coating. Likewise the second pair of contacts can be arranged on opposite ends of the thin film coating. Moreover, the contacts can be so arranged, that, for example, an imaginary connecting line between the second pair of electrical contacts and, for example, an imaginary connecting line between the first pair of contacts form an angle α (alpha), wherein the angle α is preferably selected as a function of the expansion directions of the anisotropic substrate, and lies especially preferably between 20° and 160°. For example, the imaginary connecting lines can in such case preferably match the expansion directions of the substrate with anisotropic thermal expansion.

In an embodiment of the resistance temperature sensor, the electrical contacts are arranged on the substrate so that the first measuring path experiences a different thermal expansion than the second measuring path.

In an embodiment of the resistance temperature sensor, the electrical contacts are provided, in each case, on essentially opposite ends of at least one thin film coating.

In an embodiment of the resistance temperature sensor, the contacts adjoin a single thin film coating applied on the substrate.

In an embodiment of the resistance temperature sensor, the contacts adjoin different thin film coatings, especially ones separated from one another, on the substrate.

In an embodiment of the resistance temperature sensor, the first and/or the second thin film coating has a thickness between 0.5 μm and 10 μm.

In an embodiment of the resistance temperature sensor, the substrate has a thickness between 300 μm and 2 mm.

In an embodiment of the resistance temperature sensor, the substrate has a first expansion direction a, in which one thermal expansion occurs, wherein the substrate has a second expansion direction c, in which one thermal expansion occurs.

In an embodiment of the resistance temperature sensor, the thermal expansion in the second expansion direction c is smaller than the thermal expansion in the first expansion direction a.

In an embodiment of the resistance temperature sensor, a thermally related expansion occurs along the expansion direction a of the substrate and a thermally related contraction along the expansion direction c of the substrate.

In an embodiment of the resistance temperature sensor, the first and/or the second thin film coating experiences an expansion along the expansion direction a and a contraction along the expansion direction c due to the thermal expansion of the substrate.

In an embodiment of the resistance temperature sensor, at least one thin film coating comprises a single material.

In an embodiment of the resistance temperature sensor, the material which forms at least one thin film coating has essentially the same thermal resistance and, respectively, expansion coefficient.

In an embodiment of the resistance temperature sensor, the substrate is an anisotropic crystalline material.

In an embodiment of the resistance temperature sensor, the substrate is essentially anisotropic beta-eucryptite, $LiAlSiO_4$ or a lithium aluminum silicate.

In an embodiment of the resistance temperature sensor, the substrate has a rectangular, prismatic, ellipsoidal or circular shape.

Regarding the measuring device, the object is achieved by a measuring device for determining temperature with a resistance temperature sensor according to one of the preceding embodiments.

In an embodiment of the measuring device, the first and the second measuring paths serve to determine the ambient temperature.

In an embodiment of the measuring device, the resistance measurements of the first and the second measuring paths serve for diagnosis of the resistance temperature sensor or the measuring device.

In an embodiment of the measuring device, the measuring device has a control/evaluation unit available, which serves to compare the measured resistances of the first measuring path and the second measuring path with each other In an embodiment of the measuring device, the measuring device includes two measurement signal inputs, which serve to connect the first temperature sensor element and the second temperature sensor element to the control/evaluation unit, for example one integrated in a transmitter unit.

Additionally, the object can be achieved by a corresponding method for the manufacture and/or operation of a resistance temperature sensor or a measuring device.

Another embodiment of the invention provides that, by means of the first and the second temperature sensor element, in each case, an information portion is ascertained, from which the process variable can then be determined totally. The process variable can be, for example, the deviation of the measurement signal of the first temperature sensor element from the measurement signal of the second temperature sensor element, as would be used in a calibration, for example.

Additionally, the resistance temperature sensor and/or at least the first and/or the second temperature sensor element can serve and/or be operated as a heating element. Then, for example, the anisotropic expansion of the substrate can be utilized in order to calibrate the resistance temperature sensor. In such case, the resistance temperature sensor can also additionally serve as a heating element of a thermal, flow measuring device.

BRIEF DESCRIPTION OF THE DRAWINGS

The invention will now be explained in greater detail on the basis of the appended drawing, the figures of which show as follows.

DETAILED DESCRIPTION IN CONJUNCTION WITH DRAWINGS

Figure 1:
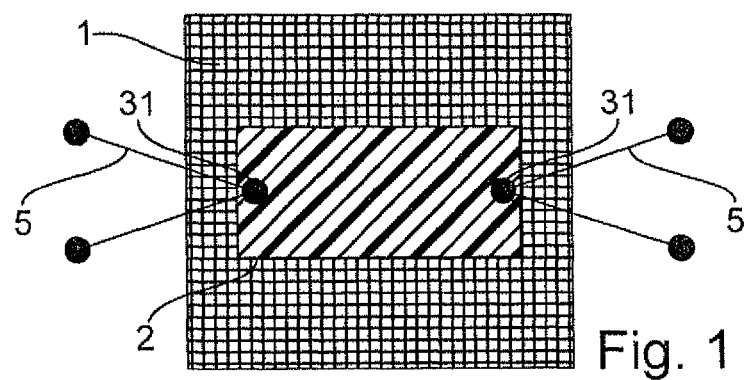
FIG. 1 is a plan view of a resistance temperature sensor according to the state of the art.

FIG. 1 shows a resistance temperature sensor according to the state of the art. In such case, a thin film layer 2, which is contactable via electrical contacts 31, is applied on a substrate 1. A measuring path on the thin film layer 2 is defined by the contacts 31. The measuring path extends, in such case, between the contacts 31. The measuring path has a so-called thin film resistance. The measuring path and the so-called thin film resistance are subject, in such case, to the thermal expansion of the underlying substrate 1.

A thin film resistance is generally a type of resistance used for integrated circuits, for example, and is embodied as a thin layer of resistive material. Numerous resistive materials can be used for forming thin film resistances. The behavior of such thin film resistances is defined by a number of parameters, which include the resistance, the resistance tolerance and the temperature coefficient of resistance (TCR) (measure of resistance change with temperature change).

The resistance in FIG. 1 is measured with four conductor technology, i.e. an electrical current flows between two of the connection lines 5 while only a voltage is sensed between the other two connection lines 5, which are thus essentially free of electrical current.

The substrate 1 applied in the example of an embodiment according to FIG. 1 has an isotropic thermal expansion, so that, in the case of a temperature change, the expansion of the material occurs independently of spatial orientation.

Figure 2:
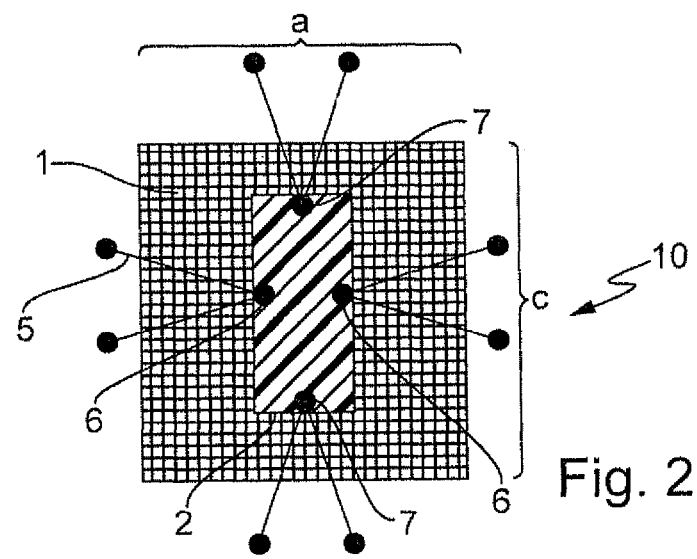
FIG. 2 is a plan view of a resistance temperature sensor in an embodiment of the present invention, wherein the substrate has anisotropic thermal expansion.

FIG. 2 shows a resistance temperature sensor 10 according to an embodiment of the present invention. In such case, the resistance temperature sensor 10 serves to measure temperature and includes a thin film coating 2 with a thickness between 0.5 and 10 micrometers made from coating materials containing conductive metal, transition metal, carbon, or carbon nano tubes, which are applied on a plate-like substrate 1 with a thickness between 300 micrometers and 2 mm, wherein the substrate 1 has anisotropic thermal coefficients of expansion, wherein the anisotropic substrate surface has one principal direction a, in which an increased thermal expansion occurs in a direction a', and in the direction c perpendicular to a and lying in the same plane, in the case of heating, a contraction occurs in the direction c' or else a smaller thermal expansion compared with the direction a, whereby the bonded thin film coating experiences an expansion in direction a' and a contraction in direction c'.

Figure 3:
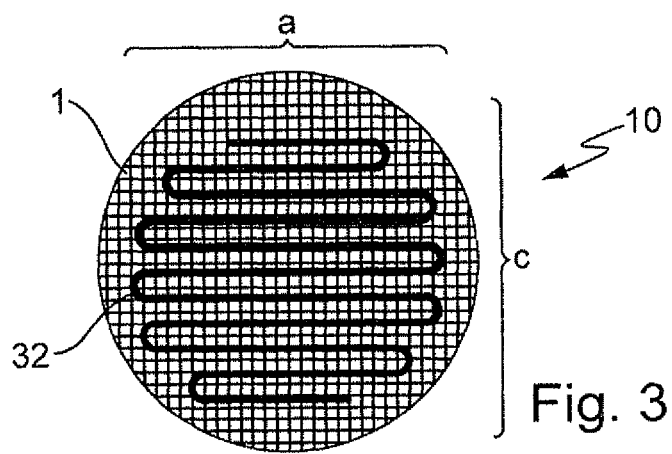
FIG. 3 is a resistance temperature sensor in an additional embodiment of the present invention, wherein the measuring path meanders.
Figure 7:
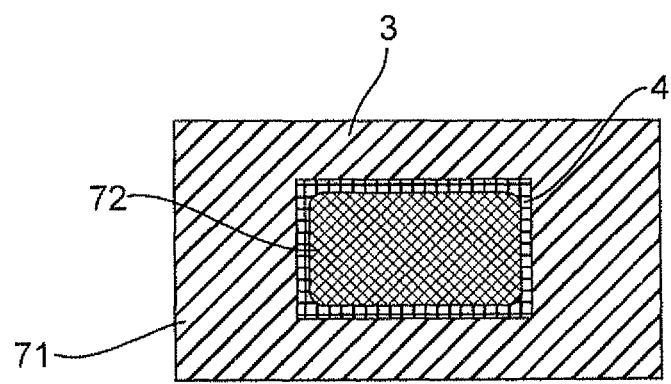
FIG. 7 is a schematic representation of a cross section through an embodiment of the proposed invention, wherein the thin film resistor is surrounded by an inerting embedding material and a substrate cover.
Figure 8:
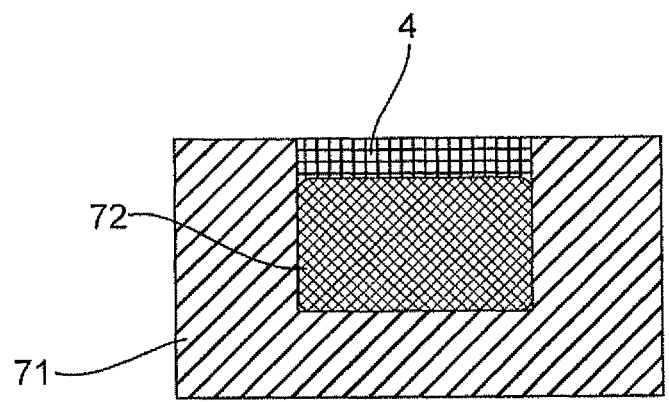
FIG. 8 is a schematic representation of a cross section through another embodiment of the proposed invention, in which the thin film resistor is surrounded only by an inerting, embedding material.

Furthermore, the resistance temperature sensor 10 can have one or more thin film segments, for example of the same coating material 2 with the same thermal resistance coefficient, which are applied, in each case, in the orientation a and in the orientation c to the same anisotropic substrate 1. The thin film coating 2 shown in FIG. 2 is contacted on opposite ends in the orientatons a and c with two or more electrical connections in the form of electrical contacts 6, 7. Via the measuring paths thus formed, resistance measurements through the contacts 6 at different coating sections of the same coating material 2 with the same thermal resistance coefficient on an anisotropic substrate 1 can be used for a measurement difference evaluation. The substrate 1 applied for this purpose can be an anisotropic crystalline material, e.g. anisotropic crystalline β-eucryptite, LiAlSiO4 or a lithium aluminum silicate. The substrate 1 for this purpose can also have a rectangular, prismatic, ellipsoidal or circular, plate-like shape. Thus, a substrate with an essentially circular outline is shown in FIG. 3 and one with an essentially square outline in FIG. 4. In general, the substrate 1 can be composed of at least one anisotropic material that has a negative thermal expansion at least in one principal direction. The conductive traces 72, especially flat conductive traces, can be covered U-shaped by the substrate 1, as shown in FIG. 7 and FIG. 8, wherein the substrate, in the latter case, extends laterally beyond the conductive traces 72. The conductive trace(s) 72 can also be completely surrounded by the anisotropic substrate material 71, as in FIG. 7, wherein the substrate base part 71 accommodating the conductive trace 72 is covered by an additional substrate flat part 3, which has an anisotropic orientation of the same sense as the base material 71. On the other hand, the conductive trace 2 can simply be "capped" with an embedding material as shown in FIG. 8.

Moreover, both surfaces of the anisotropic substrate 1 can be equipped with conductive traces 2, 32, 42.

Figure 4:
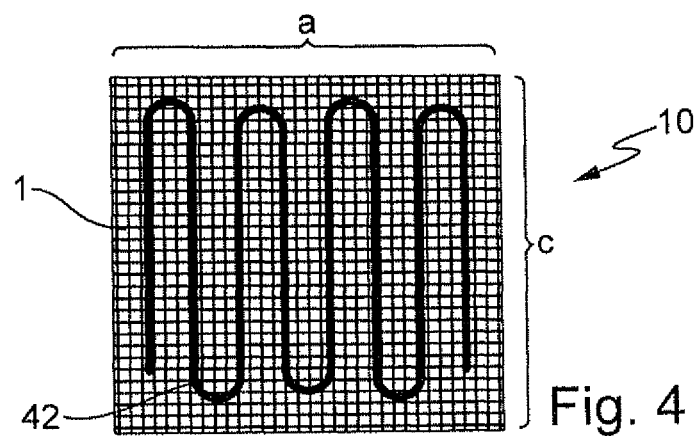
FIG. 4 is a resistance temperature sensor in an additional embodiment of the present invention with a likewise meandering measuring path.

As shown in FIG. 3 and FIG. 4, the coating can comprise meandering, hairpin curved conductive traces 32, 42. The conductive traces 32, 42 can have a rectangular cross section or an ovally rounded off, cross section.

The resistance temperature sensor 10 can be assembled of many layers, wherein a multilayered, sandwich-type construction is composed of planar portions of anisotropic substrate 1 and a conductive thin film coatings 2, which are enclosed by an inerting, dielectrically insulating, embedding material 4.

Figure 5:
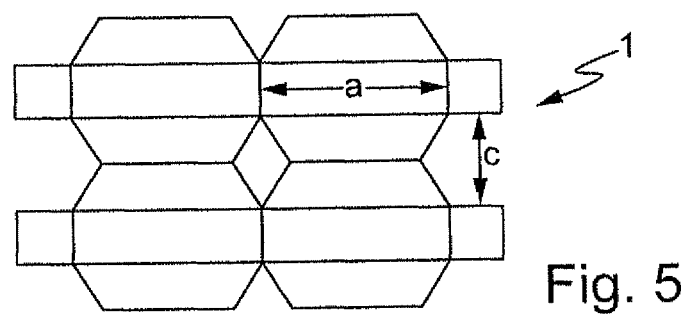
FIG. 5 is a schematic representation of the crystalline structure of an anisotropic substrate at normal temperature.
Figure 6:
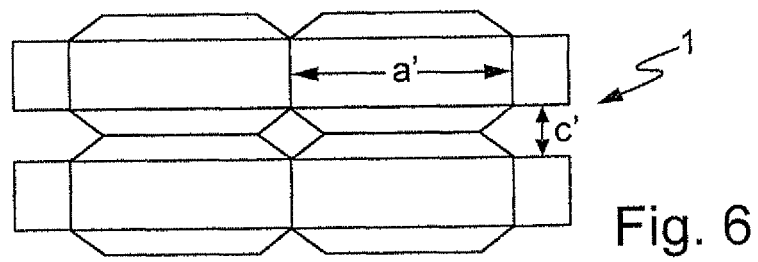
FIG. 6 is a schematic representation of the crystalline structure of the anisotropic substrate at temperature increased relative to normal temperature.

FIG. 5 and FIG. 6 show a schematic representation of the crystalline structure of the material, which forms the substrate 1. The substrate 1 has, in such case, two principal expansion directions, along which the substrate 1 experiences a change of length in the case of a temperature change. In direction a, the substrate experiences an expansion while experiencing a contraction in direction c. This is represented by the distances a' and c' in FIG. 6. Also, the thin film coating 2 applied to the substrate experiences, consequently, a comparable expansion, whereupon the electrical resistance of the thin film coating 2 changes dependent on location, or corresponding to the route of the respective measuring path.

Figure 9:
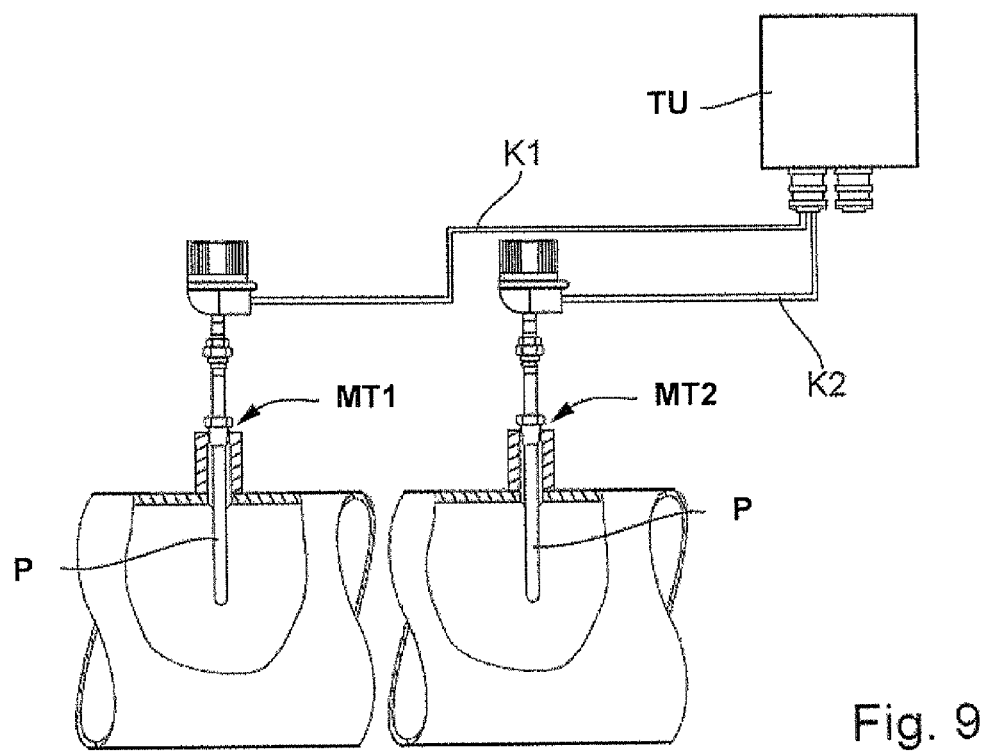
FIG. 9 is a schematic representation of two measuring transducers, which are connected to a transmitter unit.

FIG. 9 shows a schematic representation of two measuring transducers MT1, MT2 connected for monitoring a process variable in a process, which is occurring in a pipe or other container, for example. The measuring transducers MT1, MT2 can be, for example, the resistance temperature sensors 10 of the invention, however, other sensors can also be used. The firm Endress+Hauser manufacturers an extensive assortment of resistance thermometers, thermocouples and protective tubes P suited therefor.

These sensors are inserted into a protective tube P, which is exposed to the process. The measuring signals of the respective sensors carried via connection lines K1, K2 are supplied to a transmitter unit TU, which as in the case shown in FIG. 9 can be separate from the measuring transducers MT1 and MT2, respectively. For this purpose the transmitter unit TU has two measurement signal inputs available, which are connected via cable to the corresponding connections of the measuring transducers. The measurement signal inputs can be 2 conductor, 3 conductor or 4 conductor connections. Thus, the measurement signal inputs can be optimally matched corresponding to a measurement signal connector of the temperature sensor element used. For, as already indicated, the resistance of a resistance temperature sensor can be sensed in a 2, 3 or 4 conductor measurement.

The measuring signals can be evaluated by the transmitter unit TU and, in given cases, error reports can be output, as for example, in the case of drift of one of the measuring transducers or both of the measuring transducers MT1, MT2. On the other hand, the measurement signal, i.e. the measured values collected, which are used for conditioning and/or further processing, can be selected temperature dependently.

Figure 10:
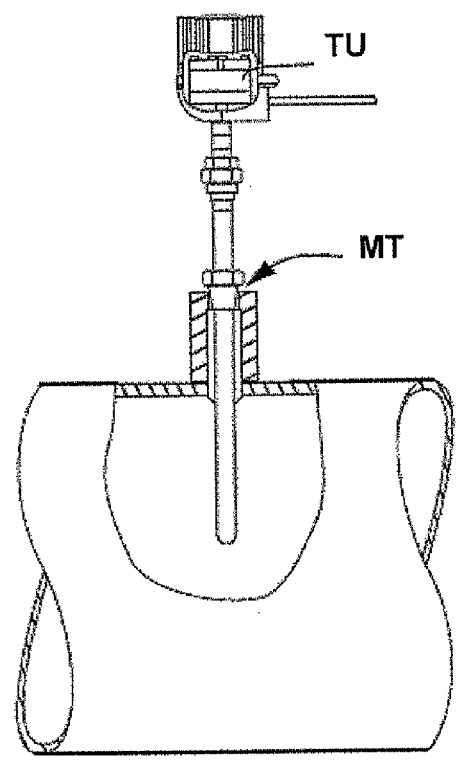
FIG. 10 is a schematic representation of a measuring transducer with a built-in transmitter unit.

Especially, a high accuracy of the measuring point, above all however, of the measuring device composed of measuring transducers MT1, MT2 and transmitter unit TU, can be achieved by so-called sensor transmitter matching. For such purpose, the output of a resistance temperature sensor 10 is linearized. This can be accomplished, for example, using the Callendar—van Dusen equation:

$$R_T = R_0(1 + A \cdot T + B \cdot T^2 + (T-100) \cdot C \cdot T^3)$$

where T is the temperature, $R_T$ the measured ohmic resistance, $R_0$ the ohmic resistance at 0° C. The coefficients A, B, C serve for matching the temperature sensor elements and the transmitter unit TU. In such case, a first set of coefficients A, B, C for matching the first temperature sensor element and a second set of coefficients A', B', C' for matching the second temperature sensor element of a resistance temperature sensor 10 of the invention can be provided. The coefficients can be ascertained during a calibration of the temperature sensor elements or the resistance temperature sensor 10 and can be stored, for example, in the transmitter unit TU.

in contrast with FIG. 9, FIG. 10 shows only one measuring transducer MT. The measuring transducer MT has an installed transmitter unit TU, a so-called temperature head transmitter. The temperature head transmitter is, for example, a two conductor measuring device with, for example, two measurement inputs and an analog output A. The measuring transducer MT can use a temperature sensor element, as shown in FIG. 1 for example, or two temperature sensor elements, e.g. in the form of the resistance temperature sensor 10 of the invention shown in FIG. 2. In the case of two temperature sensor elements, these can, for example, be redundantly designed. Consequently, the two measurement inputs of the transmitter unit TU can serve to connect a measuring transducer MT with a resistance temperature sensor of the invention, which has two temperature sensor elements. In such case, thus, the first temperature sensor element can be connected to the first measurement input and the second temperature sensor element to the second measurement input. In the transmitter unit TU, the measuring signals of the two temperature sensor elements can be (pre-) processed and/or diagnostic functions can already be executed. Thus, the transmitter unit TU, i.e. a temperature head transmitter, for example, can safely detect a line break, a short circuit, and corrosion, as well as a wiring error. Moreover, the working range of the measuring transducer MT and the ambient temperature can be monitored by the transmitter unit TU. Moreover, corrosion of the measuring transducer connection lines, which serve for the connecting the measuring transducer MT with the transmitter unit TU, can be monitored, e.g. when line resistances exceed plausible limits. In such case, for example, a corresponding error report can be output via the analog output, which uses for example, a 4 to 20 mA output signal or the HART protocol.

Due to the two measurement signal inputs, either of the embodiments according to FIG. 9 or FIG. 10 additionally can be provided with a so-called sensor backup function, which switches to the second temperature sensor element and, for example, outputs this via the analog output in case the first temperature sensor element fails. Also the two measurement inputs can serve to switch to the first and the second temperature sensor element, in case the two temperature sensor elements should be applied in different temperature or measuring ranges or are provided for use in different temperatures. As already mentioned, a drift warning can also be provided in the form of an alarm, which is output in the case of a deviation, which lies outside a predetermined limit value.

Together with the named components, the temperature head transmitter forms the total measuring point for the most varied of applications in the industrial environment.

Figure 11:
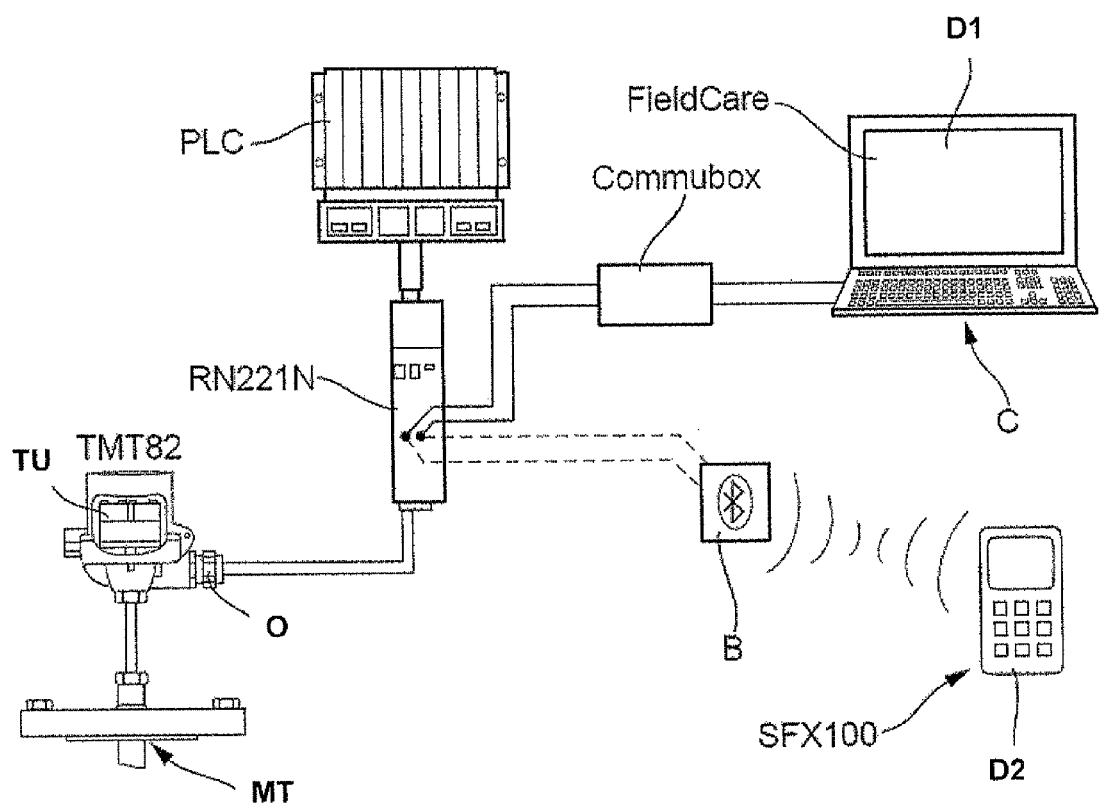
FIG. 11 is a schematic representation of a device architecture in an industrial plant.

FIG. 11 shows a schematic representation of a device architecture, as present, for example, in an industrial plant. The measuring device TMT82 has, in such case, an analog output O, via which it can communicate, for example, by means of a 4 to 20 mA electrical current signal and the HART protocol. The analog output O is connected by connecting lines to an RN221N active barrier, which supplies the measuring device TMT82 with auxiliary energy and transmits a measurement signal issued by the measuring device TMT82, for example, to a process control system PLC.

Other communication interfaces, such as a Bluetooth interface B and a Commubox signal converter, can also be connected to the active barrier RN221N, to enable communication, respectively, with an SFX100 handheld device and laptop computer C connected to the feed separator RN221N.

As presented in FIG. 11, a Bluetooth interface B can be connected to the RN221N active barrier, so that a SFX100 handheld device can be communicated with, which has, for example, a display unit D2, on which can be displayed especially measured values and/or other process relevant data.

Additionally, instead of, or in parallel with, the Bluetooth interface, a further communication interface, such as, for example, a Commubox signal converter of the firm, Endress+Hauser, can be connected. The Commubox signal converter, for example, is an intrinsically safe communication interface for transmitter units TU for converting HART signals to USB signals and thereby enabling communication with a computer C. In turn, such a computer C can run a process diagnosis and/or maintenance program, such as, for example, the Fieldcare software of the firm, Endress+Hauser. Of course, measured values and/or process relevant data can also then be displayed on this computer, especially on the display unit D1.

LIST OF REFERENCE CHARACTERS

1 substrate
2 coating material
3 substrate cover
4 inerting, embedding material
5 double contacting
6 first pair of contacts
7 second pair of contacts
a first expansion direction
c second expansion direction
TU transmitter unit
MT measuring transducer
MT1 first measuring transducer
MT2 second measuring transducer
SFX 100 handheld device
B Bluetooth interface
Commubox USB interface
C computer
PLC process control system
RN221N active barrier
D1 first display unit
D2 second display unit
Fieldcare diagnosis/maintenance program
O analog output
P protective tube
72 conductive traces
32 conductive traces
31 electrical contacts
42 conductive traces
a', c' length change in expansion direction a, c
10 resistance temperature sensor

The invention claimed is:

1. A resistance temperature sensor, comprising:
a first temperature sensor element; and
a second temperature sensor element; wherein:
said first temperature sensor element has a first measuring path and said second temperature sensor element has a second measuring path;
said first and the second measuring paths extend on a substrate;
said substrate has an anisotropic thermal expansion with at least two mutually differing expansion directions (a, c);
a projection of said first measuring path on the expansion directions (a) differs from a projection of said second measuring path on the expansion directions (c);
said first and/or said second temperature sensor element comprise at least one thin film coating, which is applied on said substrate; and
said thin film coating forms a thin film resistance.

2. The resistance temperature sensor as claimed in claim 1, wherein:
said first or said second measuring path extends on said substrate such that said first measuring path experiences a different thermal expansion than said second measuring path due to the anisotropic thermal expansion of said substrate.

3. The resistance temperature sensor as claimed in claim 1, wherein:
said first measuring path extends at least sectionally along an expansion direction (a) of said substrate, which has a different thermal expansion than an expansion direction (c) along said second measuring path.

4. The resistance temperature sensor as claimed in claim 1, wherein:
said substrate has a first expansion direction (a), in which one thermal expansion occurs; and
said substrate has a second expansion direction (c), in which another thermal expansion occurs.

5. The resistance temperature sensor as claimed in claim 1, wherein:
said substrate comprises an anisotropic, crystalline material.

6. A resistance temperature sensor, comprising: a first temperature sensor element; and a second temperature sensor element; wherein: said first temperature sensor element has a first measuring path and said second temperature sensor element has a second measuring path; said first and the second measuring paths extend on a substrate; said substrate has an anisotropic thermal expansion with at least two mutually differing expansion directions (a, c); a projection of said first measuring path on the expansion directions (a) differs from a projection of said second measuring path on the expansion directions (c), wherein:
at least a first and a second pair of electrical contacts are provided, by means of which said contacts, said first and/or said second measuring path is contactable.

7. The resistance temperature sensor as claimed in claim 6, wherein:
said first and said second measuring paths are predetermined, respectively, by said first and said second pairs of electrical contacts.

8. The resistance temperature sensor as claimed in claim 6, wherein:

said electrical contacts are arranged on said substrate in such a manner that said first measuring path experiences a different thermal expansion than said second measuring path.

9. The resistance temperature sensor as claimed in claim 6, wherein:
said electrical contacts are provided, on essentially opposite ends of at least one of said measuring paths, especially at least one thin film coating.

10. The resistance temperature sensor as claimed in claim 6, wherein:
said contacts contact a single thin film coating applied on said substrate.

11. The resistance temperature sensor as claimed in claim 6, wherein:
said contacts contact different thin film coatings on said substrate; and
said thin film coatings being separated from one another.

12. A measuring device for determining an ambient temperature at a measuring point and having a resistance temperature sensor, comprising: a first temperature sensor element; and a second temperature sensor element; wherein: said first temperature sensor element has a first measuring path and said second temperature sensor element has a second measuring path; said first and the second measuring paths extend on a substrate; said substrate has an anisotropic thermal expansion with at least two mutually differing expansion directions (a, c); a projection of said first measuring path on the expansion directions (a) differs from a projection of said second measuring path on the expansion directions (c), wherein:
the resistance measurements of the first and the second measuring paths serve for diagnosis of the resistance temperature sensor or of the measuring device.

13. A measuring device for determining an ambient temperature at a measuring point and having a resistance temperature sensor, comprising: a first temperature sensor element; and a second temperature sensor element; wherein: said first temperature sensor element has a first measuring path and said second temperature sensor element has a second measuring path; said first and the second measuring paths extend on a substrate; said substrate has an anisotropic thermal expansion with at least two mutually differing expansion directions (a, c); a projection of said first measuring path on the expansion directions (a) differs from a projection of said second measuring path on the expansion directions (c), wherein:
the measuring device has a control/evaluation unit, which serves to compare measured resistances of the first and second measuring paths with one another.

* * * * *